United States Patent
Hashimoto

(10) Patent No.: US 6,216,510 B1
(45) Date of Patent: *Apr. 17, 2001

(54) METHOD OF PRODUCING SELF-LOCK SCREW

(75) Inventor: Hideo Hashimoto, Saitama (JP)

(73) Assignee: The Holistic Environment Creators Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/269,656

(22) PCT Filed: Jul. 22, 1998

(86) PCT No.: PCT/JP98/03275

§ 371 Date: Mar. 31, 1999

§ 102(e) Date: Mar. 31, 1999

(87) PCT Pub. No.: WO99/08009

PCT Pub. Date: Feb. 18, 1999

(30) Foreign Application Priority Data

Aug. 6, 1997 (JP) .................................................. 9-223000

(51) Int. Cl.$^7$ .................................................. B21H 3/04
(52) U.S. Cl. ................................ 72/103; 411/311; 470/10
(58) Field of Search ............................ 72/103, 104, 118; 470/10; 411/310, 311

(56) References Cited

U.S. PATENT DOCUMENTS

| | | | |
|---|---|---|---|
| 3,813,718 | * | 6/1974 | Kamiya .................................. 470/10 |
| 4,426,870 | * | 1/1984 | Toropov et al. ....................... 72/118 |
| 4,764,067 | * | 8/1988 | Kawashima .......................... 411/310 |

FOREIGN PATENT DOCUMENTS

| | | |
|---|---|---|
| 7-80584 | 3/1995 | (JP) . |
| 7-83224 | 3/1995 | (JP) . |
| 7-139537 | 5/1995 | (JP) . |
| 7-197924 | 8/1995 | (JP) . |

* cited by examiner

*Primary Examiner*—Lowell A. Larson
(74) *Attorney, Agent, or Firm*—Armstrong, Westerman, Hattori, McLeland & Naughton, LLP

(57) ABSTRACT

A self-lock screw which has a deep slit so as to facilitate the elastic deformation of the flanks of a thread and enhance the locking effect and which can be produced without the need for skill of a high level and dexterity. A slit (3) which separates the flanks (21) on both sides of a thread (2) along the crest of the thread is provided, and a broad bottomed concave portion (22, 23) is formed from the vicinity of the root of the thread (2) in a shape given by inwardly scraping the extended surfaces of the flanks. Since the slit at the crest of the thread becomes deep by providing the broad bottomed concave portion in the vicinity of the root of the thread, the flanks are ready to be elastically deformed, so that the spring back effect is enhanced and the effect on preventing the screw from loosening is therefore increased.

3 Claims, 5 Drawing Sheets

METHOD OF PRODUCING SELF-LOCK SCREW

TECHNICAL FIELD

The present invention relates to a self-lock screw having a loosening preventive function and a method of producing the same and, more particularly, to a self-lock screw with the thread having a broad root so as to facilitate the elastic deformation of the flanks and enhance the locking effect and a method of producing the same.

BACKGROUND ART

A self-lock bolt with a slit formed along the crest portion of the thread and a method of producing the same are known, as described in, e.g., Japanese Patent Publication No. Hei 2-58016. In the bolt proposed in Japanese Patent Publication No. Hei 2-58016 is, the flanks of the bolt are pressed against the slit by the flanks of the nut so as to cause elastic deformation, and the bolt is kept from loosening by the pressing force of the elastic deformation. According to the method of producing such a self-lock bolt, a double-threaded screw having half a desired pitch is first formed by rolling, and the screw is then formed into a single-threaded screw having the desired pitch by rolling, thereby forming a slit along the crest portion of the thread.

When a slit is formed along the crest portion of the thread in this manner by a die similar to the one which is used for the roll forming of an ordinary screw, it is not always possible to produce a slit having an adequate depth. As a result, the rigidity on both sides of the slit becomes large and the amount of elastic deformation of the flanks becomes small, so that it is impossible to have an adequate locking effect (spring back effect) of the screw caused by the reaction of the elastic deformation.

To solve this problem, the present applicant proposed a method of producing a screw described in Japanese Patent Laid-Open No. Hei 7-139537. According to this method, in a first roll forming process, a thread groove having a small depth and a thread groove having a large depth are alternately arranged, and the thread groove having a large depth is formed into a slit in a second roll forming process. In this manner, it is possible to form a slit having an adequate depth.

However, the method of producing a screw disclosed in Japanese Patent Laid-Open No. Hei 7-139537 requires a special roll forming die for forming a thread groove having a small depth and a thread groove having a large depth which are alternately arranged, so that the cost of producing a roll forming die is disadvantageously increased. In addition, in the roll forming of a screw by such a die, since it is difficult to apply a uniform roll forming pressure, the production of a screw becomes difficult. Furthermore, since the depth of the slit becomes smaller than that produced by a conventional method, if the phase adjustment of the roll forming die and the groove of a screw is reversed, it is necessary to pay close attention to the phase adjustment. In this manner, the first roll forming process and the second roll forming process require skill of a high level and dexterity. Furthermore, the product yield is poor.

Accordingly, it is an object of the present invention to provide a self-lock screw with the thread having a broad root so as to form a deep slit without the need for skill of a high level or dexterity and facilitate the elastic deformation of the flanks which heightens the self-lock effect.

DISCLOSURE OF INVENTION

To achieve this end, a self-lock screw according to the present invention is provided with a slit which separates the flanks on both sides of a thread along the crest of the thread, and the vicinity of the root is formed as a broad bottomed concave portion in a shape given by inwardly scraping the extended surfaces of the flanks. Since the slit at the crest portion of the thread becomes deep by providing the broad bottomed concave portion in the vicinity of the root of the thread, the flanks are ready to be elastically deformed, so that the spring back effect is enhanced and the effect on preventing the screw from loosening is increased. In addition, it is possible to produce a self-lock screw of the standard dimension having a slit from a material for a screw of the standard dimension. Since it is possible to use a generally used material of the standard dimension without the need for a material of a specific dimension, it is possible to reduce the production cost.

In this self-lock screw, the broad bottomed concave portion is preferably approximately rectangular in a transverse section of the thread. The bottom surface of the broad bottomed concave portion can be flat in a transverse section of the thread.

In this self-lock screw, the bottom surface of the broad bottomed concave portion may be approximately arcuate in a transverse section of the thread. Alternatively, the bottom surface of the broad bottomed concave portion can be flat at the central portion and approximately arcuate in the vicinities of both end portions in a transverse section of the thread. In this manner, since the root portion of the thread has a wide area as a broad bottomed concave portion and the curvature changes comparatively gradually, the stress concentration on the root portion is unlikely to be caused, thereby reducing the possibility of stress breaking or fatigue breaking.

In this self-lock screw, the bottom surface of the slit may be approximately arcuate in a transverse section of the thread. Since the cross section of the slit is arcuate with the bottom portion largely scraped off, the flanks are further ready to be elastically deformed, so that the spring back effect is further enhanced. It is also possible to form the screw in such a manner as to have a slightly larger flank angle than an ordinary one, thereby enhancing the adaptability of the screw to a female screw having a tolerance.

A method of producing a self-lock screw provided in one aspect of the present invention comprises: a first roll forming process for forming double a desired number of thread grooves having half a desired pitch by rolling a screw material; and a second roll forming process for forming every other thread groove produced in the first roll forming process into a broad bottomed concave portion having a shape given by inwardly scraping the extended surfaces of the flanks, and assembling the double threads formed in the first roll forming process so as to form a single thread having a slit along the crest. Since a slit having a large depth is formed at the crest portion of the thread by forming a broad bottomed concave portion in the vicinity of the root of the thread in the second roll forming process, the elastic deformation of the flanks is facilitated, so that the spring back effect is enhanced and the effect on preventing the screw from loosening is increased. In addition, since it is possible to produce a self-lock screw of the standard dimension having a slit from a screw material having a diameter of the standard dimension. Since it is possible to use a generally used material of the standard dimension without the need for a material of a specific dimension, it is possible to reduce the production cost.

In the method of producing a self-lock screw, it is possible to set the flank angle of the thread formed in the first roll forming process to be smaller than the flank angle of the thread produced in the second roll forming process. In this manner, since the depth of the slit at the crest portion of the thread becomes even larger, the spring back effect of the flanks, i.e., the effect on preventing the screw from loosening is further increased.

In addition, in the first roll forming step in the method of producing a self-lock screw, it is also possible to form the thread in such a manner that the radius of curvature at the root portion is larger than the radius of curvature at the crest portion in the cross section of the thread. In this manner, the cross section of the slit has an arcuate shape given by largely scraping off the bottom portion of the slit, the flanks are further ready to be elastically formed, so that the spring back effect is further enhanced. It is also possible to form the screw in such a manner as to have a slightly larger flank angle than an ordinary one, thereby enhancing the adaptability of the screw to a female screw having a tolerance.

A method of producing a self-lock screw provided in another aspect of the present invention comprises: a first roll forming process for forming double a desired number of thread grooves having half a desired pitch by rolling a screw material; and a second roll forming process for forming every other thread groove produced in the first roll forming process into a root portion, and assembling the double threads formed in the first roll forming process so as to form a single thread having a slit along the crest, wherein the flank angle of the thread formed in the first roll forming process is set to be smaller than the flank angle of the thread produced in the second roll forming process. Since the flank angle of the thread formed in the first roll forming process is made smaller, the slit having a large depth is formed at the crest portion of the thread, so that the spring back effect, i.e., the effect on preventing the screw from loosening is increased.

BEST MODE FOR CARRYING OUT THE INVENTION

Figure 1:
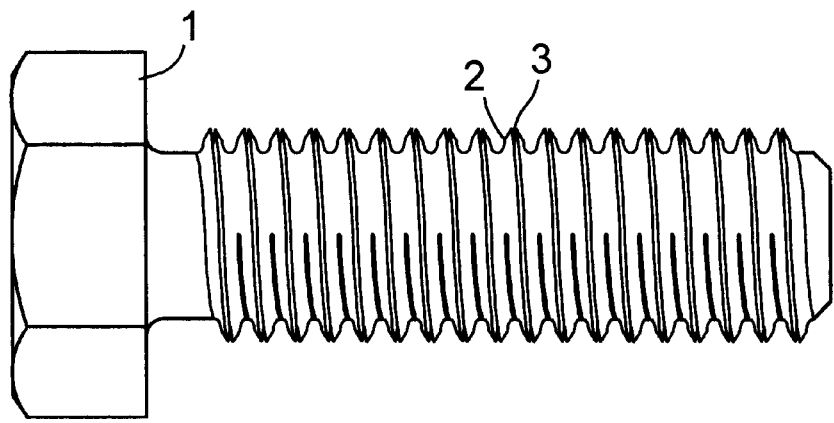
FIG. 1 shows the entire structure of a self-lock screw according to the present invention.
Figure 2:
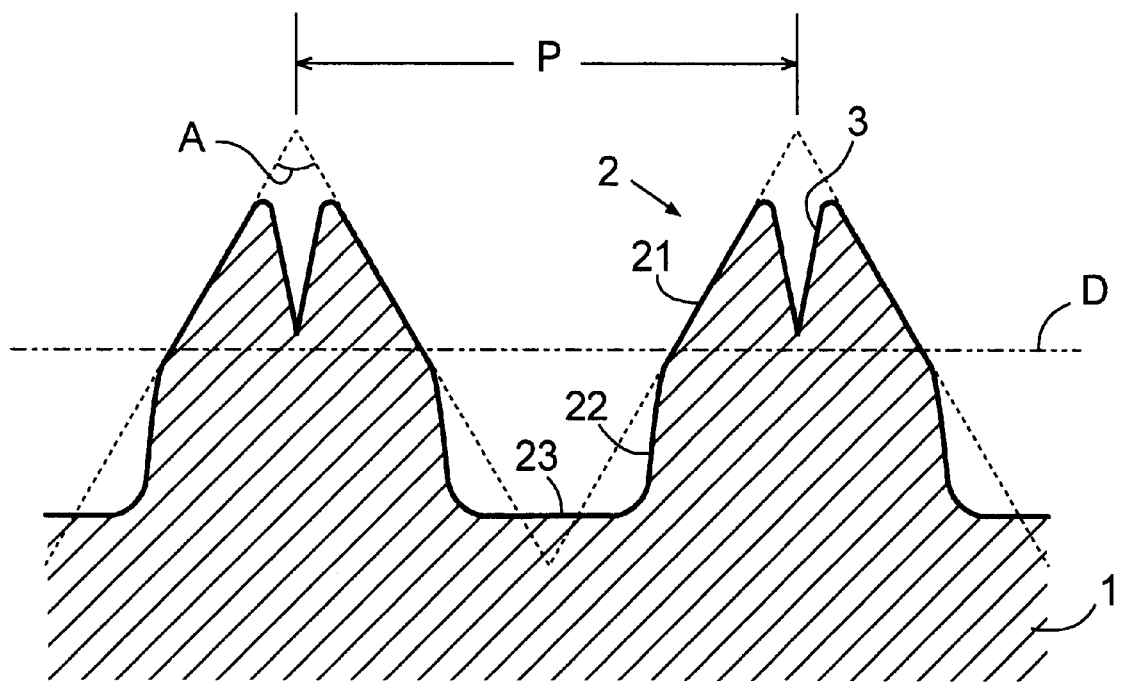
FIG. 2 is an enlarged cross sectional view of a thread.

A first embodiment of the present invention will be explained with reference to drawings. FIG. 1 shows the entire structure of a self-lock screw according to the present invention. The screw shown in FIG. 1 is a hexagon headed bolt, but this embodiment is applicable to another arbitrary male screw or female screw. A self-lock screw 1 is provided with a slit 3 along the crest of the thread 2. The enlarged cross section of the thread 2 is shown in FIG. 2. The slit 3 is formed along the crest of the thread 2, and flanks 21, which are the inclined surfaces on both sides of the crest of the thread 2, are separated by this slit 3. As a result, the flanks 21 on both sides of the thread 2 are elastically deformable, and when the screw is tightened, the flanks 21 are pressed toward the slit 3 so as to cause elastic deformation. Owing to the pressing force of the elastic deformation, the screw is kept from loosening.

The thread 2 is formed in such a manner as to have a desired pitch P. The flank angle A, i.e., the angle at which the flanks 21 on both sides of the thread 2 cross each other is also set at a desired angle. The flank angle A is ordinarily set at 60 degrees. The position of the effective diameter D of the screw is indicated by the two-dot chain line. The root portion of the thread 2 is formed as a broad bottomed concave portion having a shape given by inwardly scraping the extended surfaces of the flanks 21 below the effective diameter D. The bottom surface 23 of the broad bottomed concave portion is formed in such a manner as to be broader than the one in a conventional screw and to be comparatively flats. The angle at which the side surfaces 22 of the broad bottomed concave portion cross each other is set to be considerably smaller than the flank angle. When the flank angle A is 60 degrees, the angle at which the side surfaces 22 cross each other is, for example, 20 to 40 degrees (preferably 25 to 35 degrees). Since the angle at which the side surfaces 22 cross each other is considerably small, the broad bottomed concave portion assumes an approximately rectangular shape in the cross section of the thread 2.

A method of producing the thread 2 having the slit 3 at the crest portion and a broad bottomed concave portion will next be explained. Double the number of threads having half the pitch of the screw as a final product are first formed by rolling a screw material. This process will be referred to as a first roll forming process hereinunder. Thereafter, every other thread produced in the first roll forming process is formed into a broad bottomed concave portion having a shape given by inwardly scraping the extended surfaces of the flanks in the vicinity of the root, and the double threads formed in the first roll forming process are assembled so as to form a single thread having a slit along the crest. This process will be referred to as a second roll forming process hereinunder. The number of threads formed in the first roll forming process is two (twice 1) if the screw as a final product is a single-threaded screw, and four (twice 2) if the screw as a final product is a double-threaded screw.

Figure 3:
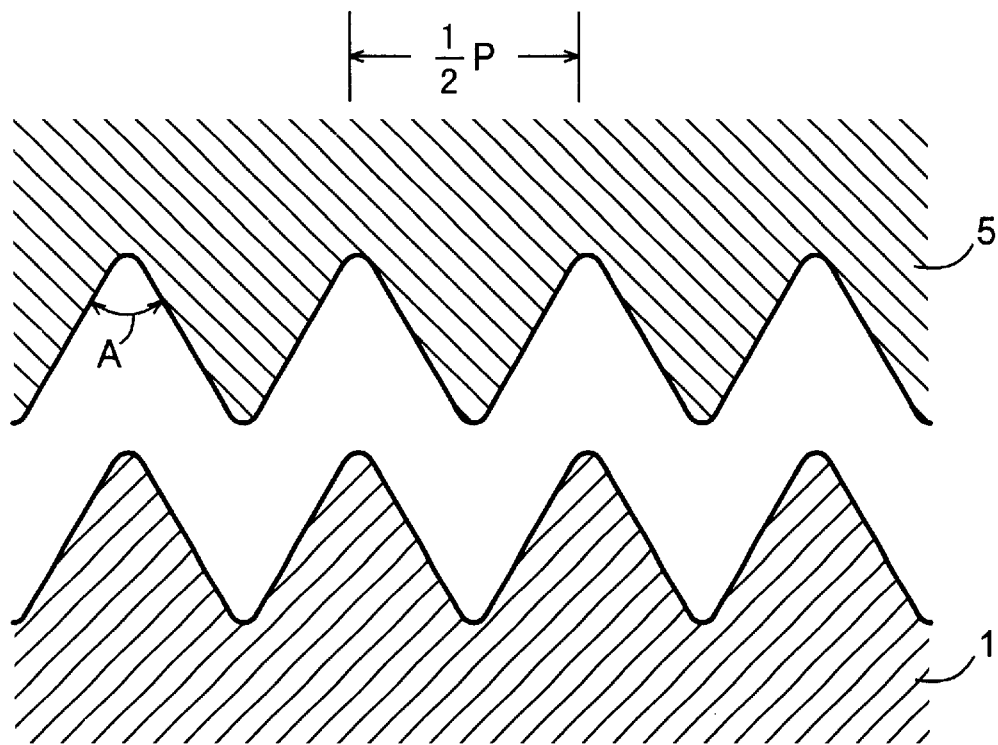
FIG. 3 is a sectional view showing a first roll forming process.

FIG. 3 is a sectional view of a thread and a die for a first roll forming process. The material for the self-lock screw 1 is formed by a die 5 for a first roll forming process by rolling so as to form a plurality of threads. The flank angle A of the thread produced in the first roll forming process is the same as the flank angle of the final product. The pitch of the thread in the first roll forming process is ½ of that of the thread of the final product. The number of threads in the first roll forming process is twice the number of threads in the final product. If the screw as the final product is a single thread screw, the number of threads in the first roll forming process is two. Accordingly, the lead angle of the screw is the same as that of the final product.

Figure 4:
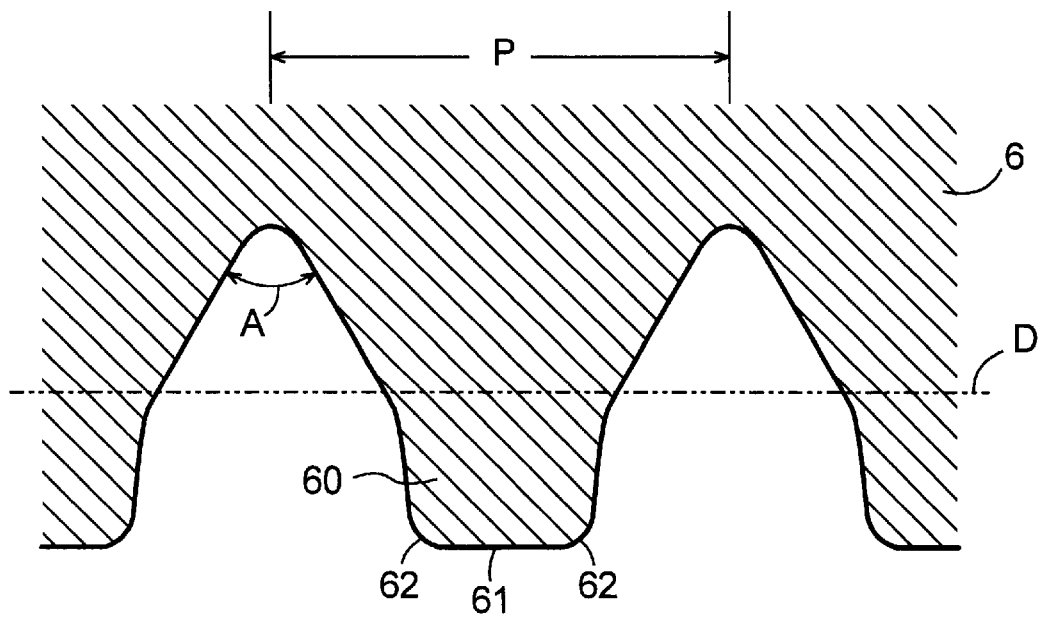
FIG. 4 is a sectional view of a die for a second roll forming process.

FIG. 4 is a sectional view of a die 6 for a second roll forming process. Every adjacent pair of threads formed in the first roll forming process are assembled by the die for a second roll forming process, and are formed into one thread having the slit 3 at the crest portion by rolling. The flank angle A and the pitch P of the die 6 for a second roll forming process are the same as those of the final product. The die 6 for a second roll forming process is provided with a broad bottom forming portion 60 for forming the broad bottomed concave portion of the self-lock screw 1. The broad bottom forming portion 60 forms every other root portion (thread groove) formed in the first roll forming process into a broad bottomed concave portion.

Since the screw material which is pressed away by the broad bottom forming portion 60 plastically moves toward the crest portion of the thread 2, the slit 3 formed is deeper than that of a screw having no broad bottomed concave portion. As a result, the flanks 21 are apt to be elastically deformed, thereby enhancing the spring back effect. In addition, it is possible to produce a self-lock screw with a slit which has the dimension corresponding to the dimension of an ordinary screw without a slit at the crest portion even from a material for a screw having a general diameter. That is, it is possible to use a material for general use without the need for a material having a specific dimension, thereby reducing the production cost. Furthermore, since the root portion of the thread has a large area as a broad bottomed concave portion and the curvature changes comparatively gradually, the stress concentration on the root portion is unlikely to be caused, thereby reducing the possibility of stress breaking or fatigue breaking.

Figure 5:
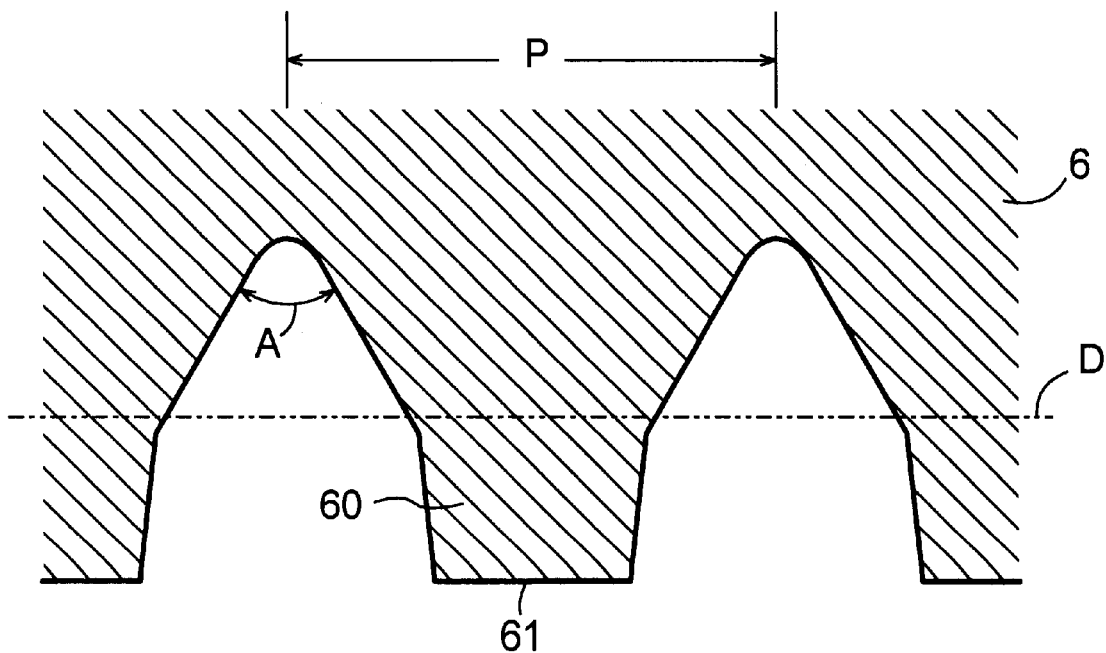
FIG. 5 is a sectional view of another example of a die for a second roll forming process.
Figure 6:
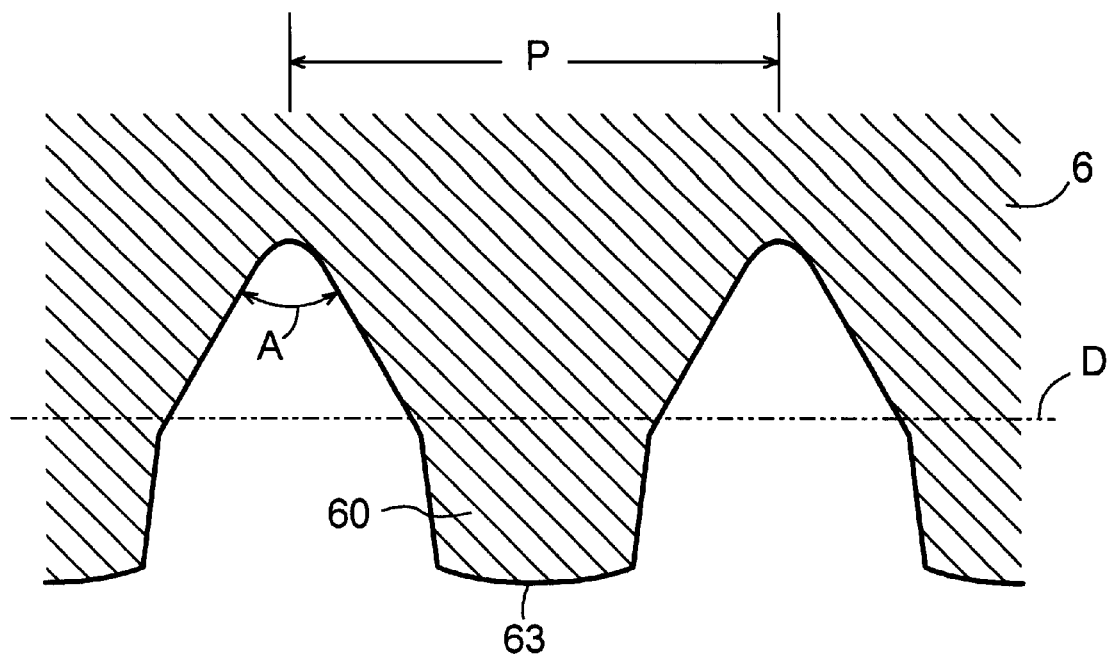
FIG. 6 is a sectional view of still another example of a die for a second roll forming process.

The broad bottom forming portion 60 of the die 6 for a second roll forming process is provided with a flat portion 61 for forming the bottom surface 23 of the broad bottomed concave portion at the central portion thereof, and arcuate corner portions 62 at both corner portions of the flat portion 61. In this case, the bottom surface 23 of the broad bottomed concave portion of the self-lock screw 1 has the corresponding shape. Other examples of the die 6 for a second roll forming process are shown in FIGS. 5 and 6. In the die 6 for a second roll forming process shown in FIG. 5, the portion of the broad bottom forming portion 60 for forming the bottom surface 23 is composed of only the flat portion 61. In this case, since the shape of the die is simplified, the production cost is reduced. In the die 6 for a second roll forming process shown in FIG. 6, the portion of the broad bottom forming portion 60 for forming the bottom surface 23 is provided as the arcuate portion 63. If the die 6 for a second roll forming process has the above described shape shown in FIG. 5 or 6, the bottom surface 23 of the broad bottomed concave portion of the self-lock screw 1 has the corresponding shape.

It is possible to provide the die 5 for a first roll forming process and the die 6 for a second roll forming process separately from each other and to sequentially execute the first roll forming process and the second roll forming process. Alternatively, the die 5 for a first roll forming process and the die 6 for a second roll forming process may be provided as a solid die, and the first roll forming process and the second roll forming process may be continuously executed as one cycle of roll forming.

Figure 7:
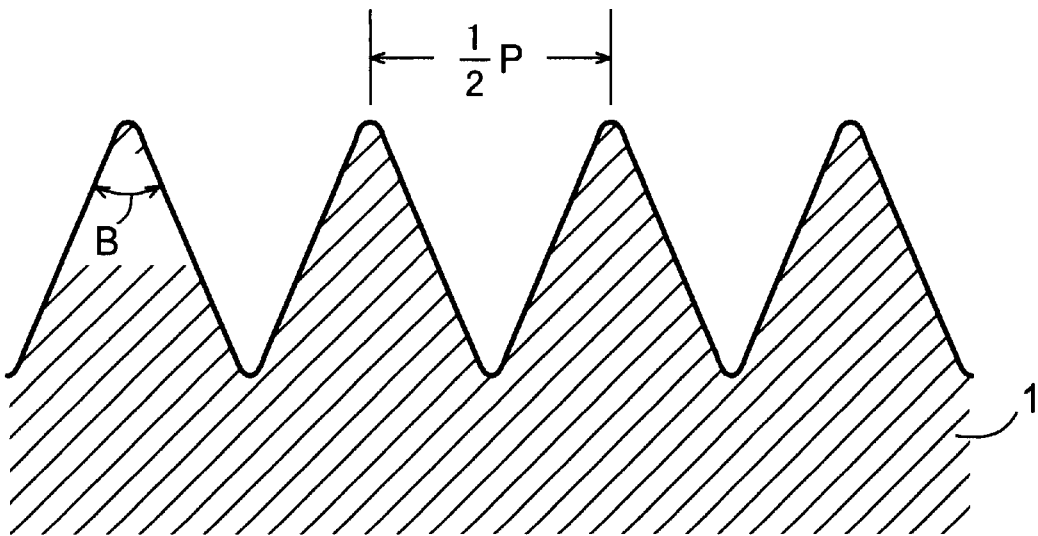
FIG. 7 is a sectional view of a thread after a first roll forming process in a second embodiment of the present invention.

A method of producing a self-lock screw as a second embodiment of the present invention will next be explained. This embodiment is the same as the first embodiment in that a thread is formed by two processes, i.e., a first roll forming process and a second roll forming process. FIG. 7 shows the cross section of a thread after the first roll forming process in the second embodiment. The pitch of the thread in the first roll forming process is ½ of that of the thread of a final product. The flank angle B of the thread in the first roll forming process is set to be smaller than the flank angle A of the final product.

As a result, the height of the thread is larger than the height of a thread having the flank angle A. The flank angle B is determined in such a manner that the height of the thread is within twice the height of a thread having the flank angle A. When the flank angle A of a screw as the final product is 60 degrees, the flank angle B can be about 45 degrees. The die for a first roll forming process has a shape for forming the thread having the above-described shape.

Figure 8:
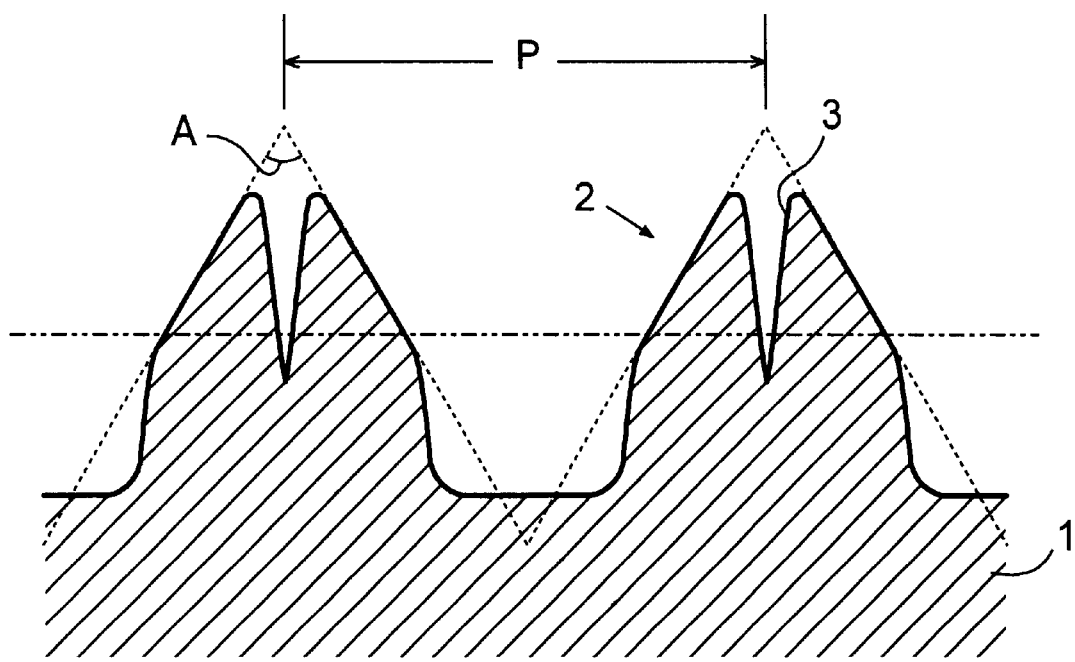
FIG. 8 is a sectional view of a thread after a second roll forming process in a second embodiment of the present invention.

FIG. 8 is a sectional view of a thread after a second roll forming process in the second embodiment. A die for a second roll forming process has the same shape as the die shown in FIG. 4 in the first embodiment. However, since the height of the thread in the first roll forming process becomes larger than that in the first embodiment, it is possible to form the slit 3 having a larger depth than that in the first embodiment. When the flank angle A is 60 degrees and the flank angle B is 45 degrees, the slit 3 has 1.4 times as large a depth as that in the first embodiment.

Consequently, the elastic deformation of the flanks is further apt to be caused, and the spring back effect is further enhanced. Although a broad bottomed concave portion is formed in the second roll forming process in the second embodiment, the root portion of an ordinary thread may be formed in the second roll forming process. Even in this case, the screw has a deeper slit than a conventional self-lock screw, and the spring back effect is enhanced.

Figure 9:
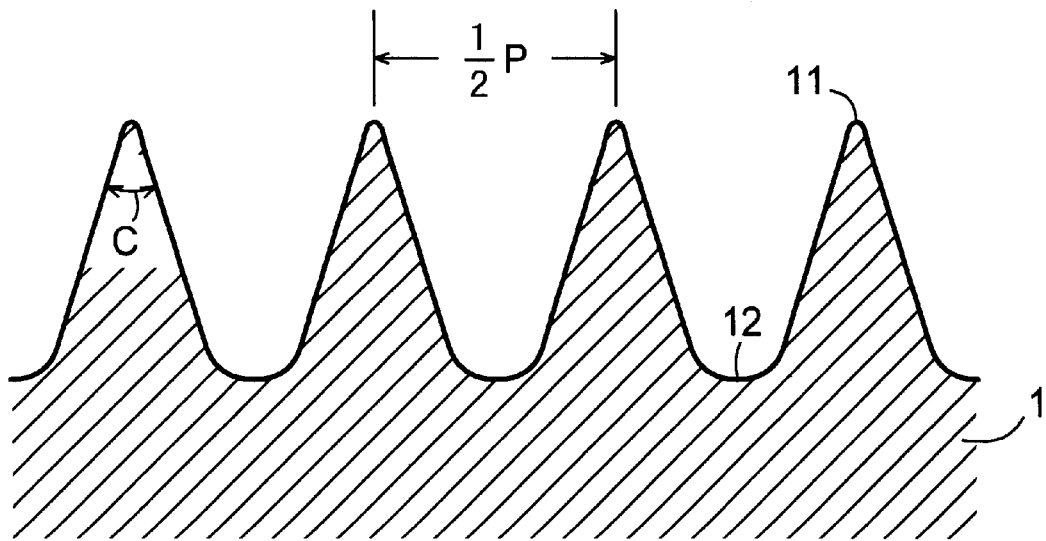
FIG. 9 is a sectional view of a thread after a first roll forming process in a third embodiment of the present invention.

A method of producing a self-lock screw as a third embodiment of the present invention will next be explained. This embodiment is the same as the first embodiment in that a thread is formed by two processes, i.e., a first roll forming process and a second roll forming process. FIG. 9 shows the cross section of a thread after the first roll forming process in the third embodiment. The pitch of the thread in the first roll forming process is ½ of that of the thread of a final product. The flank angle C of the thread in the first roll forming process is set to be smaller than the flank angle A of the final product. The thread has a shape in which the radius of curvature of the root portion 12 is larger than the radius of curvature of the crest portion 11. The die for a first roll forming process has a shape for forming the thread having the above-described shape.

Figure 10:
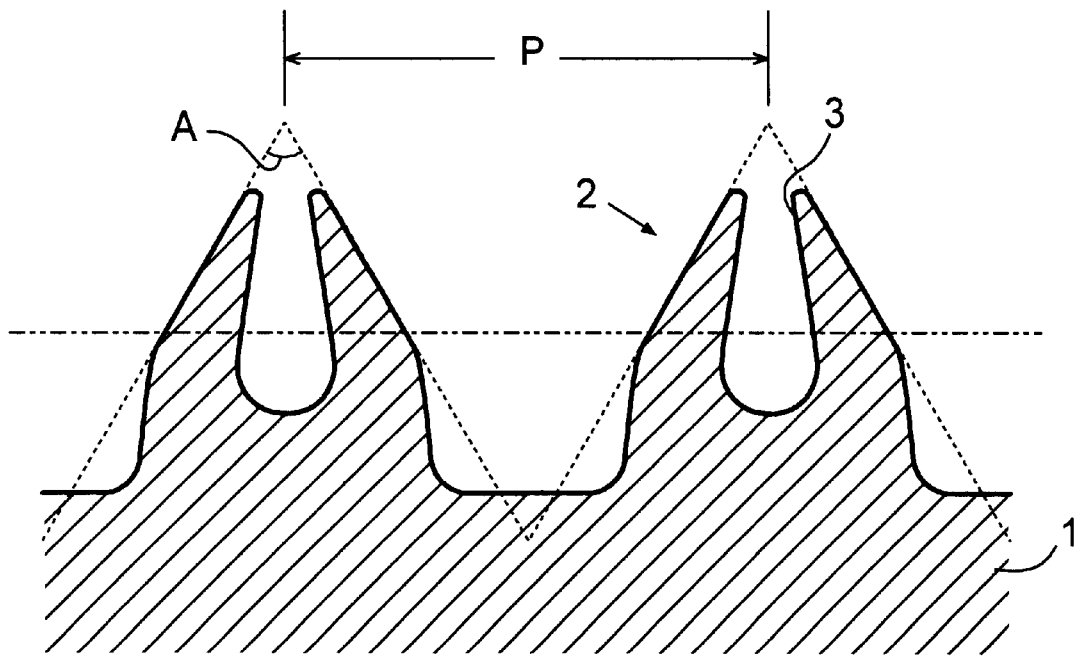
FIG. 10 is a sectional view of a thread after a second roll forming process in a third embodiment of the present invention.

FIG. 10 is a sectional view of a thread after a second roll forming process in the third embodiment. A die for a second roll forming process has the same shape as the die shown in FIG. 4 in the first embodiment. Since the radius of curvature of the root portion 12 is made larger in the first roll forming process, the cross section of the slit 3 after the second roll forming process becomes an arcuate shape which is given by largely scraping out the bottom portion. In addition, the width of the slit 3 becomes larger toward the depth than at the opening portion.

For this reason, the flanks are more easily elastically deformed, and the spring back effect is further increased. Since the flanks are easily elastically deformed, even if the flank angle is set to be larger than an ordinary one (e.g., 60 degrees), it is possible to screw it to a corresponding female screw. If the screw is formed in such a manner as to have a slightly larger flank angle than an ordinary one, it is applicable to a female screw having a large tolerance, thereby enhancing the adaptability and enabling mass production.

Although the self-lock screw is explained as a male screw in the above-described embodiments, it is possible to apply the self-lock screw to a female screw. As a screw material, any material used for a screw is usable. For example, stainless steel, steel, other metals and plastic are usable. In addition, although roll forming is adopted for producing a screw in the above-described embodiments, a self-lock screw with a thread having the above-described shape according to the present invention may be formed by another manufacturing process such as injection molding.

INDUSTRIAL APPLICABILITY

As described above, according to a process for producing a self-lock screw according to the present invention, it is possible to produce a self-lock screw having an excellent effect on preventing the screw from loosening, and a self-lock screw produced by this method is applicable to a product in any field in which a screw is used. Especially, the self-lock screw according to the present invention is fit for attaching a movable part, for fixing a part which is vibrated so much that a screw is apt to be loosened, or when the size of a screw is so small that the tightening force cannot be increased. For example, it is optimum as a screw for fixing a movable portion of a bow of glasses to a frame.

What is claimed is:

1. A method of producing a self-lock screw, comprising:

a first roll forming process for forming double a desired number of thread grooves having half a desired pitch to define threads in such a manner that each of said thread grooves has the same shape; and a second roll forming process for forming every other thread groove formed in said first roll forming process into a generally channel shaped broad bottomed concave portion having a diameter smaller than a diameter of said thread groove formed in said first roll forming process to define a double-thread therebetween, and deforming said double-thread so as to form a single-thread having a slit with an opened top end along a crest of said single-thread and having a flank angle larger than an angle at which side surfaces of said broad bottomed concave portion cross each other.

2. The method of producing a self-lock screw according to claim 1, wherein a flank angle of said thread formed in said first roll forming process is set to be smaller than a flank angle of said single-thread formed in said second roll forming process.

3. The method of producing a self-lock screw according to claim 1, wherein a radius of curvature at a root portion of said thread formed in said first roll forming process is set to be larger than a radius of curvature at a crest portion in a cross section of said thread.

* * * * *